United States Patent [19]

Okuda et al.

[11] Patent Number: 5,779,777
[45] Date of Patent: Jul. 14, 1998

[54] EMULSION INK FOR STENCIL PRINTING

[75] Inventors: Sadanao Okuda; Teruaki Ohkawa, both of Inashiki-gun, Japan

[73] Assignee: Riso Kagaku Corporation, Tokyo, Japan

[21] Appl. No.: 823,486

[22] Filed: Mar. 25, 1997

[30] Foreign Application Priority Data

Mar. 26, 1996 [JP] Japan .................................. 8-097527

[51] Int. Cl.$^6$ .................................................. C09D 11/02
[52] U.S. Cl. .................... 106/31.26; 106/31.65; 106/417; 106/418
[58] Field of Search ................ 106/31.26, 31.65, 106/417, 418, 479

[56] References Cited

U.S. PATENT DOCUMENTS

| | | | |
|---|---|---|---|
| 4,544,415 | 10/1985 | Franz et al. | 106/417 |
| 4,585,815 | 4/1986 | Ono et al. | 106/31.25 |
| 4,623,396 | 11/1986 | Kimura et al. | 106/417 |
| 5,575,839 | 11/1996 | Okuda | 106/31.25 |

FOREIGN PATENT DOCUMENTS

| | | |
|---|---|---|
| 871175 | 5/1971 | Canada . |
| 58-164653 | 9/1983 | Japan . |
| 61-255967 | 11/1986 | Japan . |
| 64-14284 | 1/1989 | Japan . |
| 4-132777 | 5/1992 | Japan . |
| 5-117565 | 5/1993 | Japan . |
| 6-191146 | 7/1994 | Japan . |
| 6-219043 | 8/1994 | Japan . |

OTHER PUBLICATIONS

'Pearlescent & Iridescent Luster Pigments', Mearlin Catalogue, no date available.

Primary Examiner—Helene Klemanski
Attorney, Agent, or Firm—Pillsbury, Madison & Sutro LLP; Cushman, Darby & Cushman Intellectual Property Group

[57] ABSTRACT

A water-in-oil (W/O) emulsion ink for stencil printing having an oil phase and a water phase is provided, in which a pearlescent pigment is contained in said oil phase and/or said water phase in an amount of 1 to 20% by weight of the total weight of said emulsion ink. The pearlescent pigment has an average particle size of 1 to 30 μm. The pearlescent pigment preferably has a hiding power of 1,000 cm$^2$/g or lower. A colorant may be contained in at least one of said oil phase and said water phase. The oil phase preferably contains a non-volatile solvent, a volatile solvent, and an emulsifier, and optionally a resin. The water phase preferably contains an oil-in-water (O/W) emulsion of resin and/or a water soluble resin. The emulsion ink provides glossy printed images regardless of types of paper, and is quick in drying.

5 Claims, No Drawings

EMULSION INK FOR STENCIL PRINTING

The present invention relates to an emulsion ink for stencil printing, and more specifically relates to an emulsion ink which provides glossy printed images on articles to be printed regardless of types of the articles, and is quick in drying.

Stencil printing is effected by perforating a stencil sheet to make a master, and passing inks through the perforated portions of the master to an article to be printed such as printing paper. Since the master is easy to make, stencil printing is utilized in a wide range of fields.

Conventional inks for stencil printing are usually water-in-oil (W/O) emulsion inks which dry by permeation into the inside of an article such as printing paper to be printed or by evaporation of water phase components of the emulsion. (Refer to Japanese Patent Laid-open (Kokai) Nos. 255967/86, 14284/89, 132777/92 and 117565/93.)

Since the W/O emulsion ink dries by permeation into the inside of paper as mentioned above, little component of the ink remains on the surface of paper. As a result, printed image is poor in glossiness.

Glossiness varies depending upon roughness or other surface condition of articles to be printed. In particular, printing paper usually used in stencil printing has on its surface so much roughness as to be permeated by components of inks, and thus glossiness is not easily obtained on printed image. Conversely, glossiness is easier to obtain when stencil printing is effected on coated or art paper or other printing paper having a smooth surface. However, such printing paper is non-permeable paper into which inks can hardly permeate, and thus causes much set-off.

Also, many attempts have been proposed to treat the surface of articles to be printed with fine particles of silica or the like in order to obtain both smoothness and permeability. In any way, such printing paper as surface-treated in this manner must be selected to obtain glossiness. (Refer to Japanese Patent Laid-open (Kokai) Nos. 219043/94 and 191146/94.)

Further, it is possible to obtain glossiness by use of printing inks of the type which contains a resin that dries by oxidation-polymerization on articles to be printed such as printing paper so as to form a film of inks on the surface of the articles. However, since stencil printing has much amount of inks (5 to 20 µm in thickness) transferred to form printed image, printing inks are not quickly dried, causing problems on set-off.

It is also suggested that pearlescent pigments themselves are used as colorants. (Refer to Japanese Patent Laid-open (Kokai) No. 164653/83). However, they are limited in color to blue, blue black, black, dark brown and the like. Although it is considered that the surface of pearlescent pigments is coated directly with organic pigments or carbon black, this is poor in production and high in cost anyway.

Black printing inks are particularly required to have varieties so as to meet the demand for not only mat print but also glossy print. It has, therefore, been a long-standing object that a glossy print is attained by stencil printing processes using printing inks that permeate into the inside of the paper.

It is an object of the present invention to overcome the above-mentioned problems on prior art, and provide an emulsion ink for stencil printing which provides glossy printed images regardless of types of paper and is quick in drying.

According to the present invention, the above object is attained by a water-in-oil (W/O) emulsion ink for stencil printing, having an oil phase and a water phase, in which a pearlescent pigment is contained in said oil phase and/or said water phase in an amount of 1 to 20% by weight of the total weight of said emulsion ink, said pearlescent pigment having an average particle size of 1 to 30 µm.

The present emulsion ink is dried by permeation into the inside of paper and/or evaporation of water. However, since the present ink contains a pearlescent pigment which tends to remain on the surface of printing paper, it can provide glossy printed images.

Conventional inks for stencil printing provide printed images with different glossiness depending upon kinds of printing paper. However, since the present emulsion ink leaves pearlescent pigments on the surface of printing paper, it can provide so-called glossy prints regardless of types of printing paper.

According to the present emulsion ink, the liquid components permeate and/or dry whilst the pearlescent pigment is left on the surface of printing paper. Thus, the pearlescent pigment on printing paper readily separates from the liquid components, but does not inhibit the ink from drying, thereby accelerating drying speed.

The pearlescent pigment used in the present invention includes mica coated with metal oxides, natural pearl essence, basic carbonates, acid lead arsenate, bismuth oxychloride, and the like. Particularly advantageous is mica coated with metal oxides, including mica coated with titanium oxide such as titanium dioxide or iron oxide, which are scaly particles of commonmica (i.e., $KAl_2$ $(AlSi_3O_{10})$ $(OH_2)$) that have been provided on the surface thereof with a coat of titanium oxide or iron oxide in even thickness.

The pearlescent pigment may be contained in at least one of the oil phase and the water phase of the emulsion. It is preferred that the pearlescent pigment is contained in the oil phase because emulsion stability is not damaged.

The pearlescent pigment should have an average particle size of 1 to 30 µm, preferably 2 to 15 µm. Within this range of particle size, the pearlescent pigment can provide glossiness without deteriorating colors of colorants. When the average particle size is 1 µm or lower, the pearlescent pigment is poor in glossiness, and is difficult to remain on the surface of printing paper. When the average particle size is larger than 30 µm, the pearlescent pigment inhibits colorants from coloring to deteriorate the color, has a size larger than the size of perforations in stencil sheets used for stencil printing machines, inhibits the printing ink from passing through the perforations to create unprinted portions so-called "white dots" on printed images, inhibits an image reproduction faithful to the original, and also lowers stability of the emulsion ink.

Addition amount of the pearlescent pigment is 1 to 20% by weight, preferably 2 to 15% by weight based on the total weight of the emulsion ink. If it is less than 1% by weight, glossiness is difficult to obtain. If it is more than 20% by weight, the pearlescent pigment inhibits colorants from coloring to deteriorate the color like the case where the pigment has a large particle size.

When printed images are desired with high printing density and glossiness and without great change in color of colorants contained in the ink, it is desired that the pearlescent pigment has a hiding power of 1,000 $cm^2/g$ or less, preferably 500 $cm^2/g$ or less. When a pearlescent pigment having a high hiding power is used, coloring by colorants contained in the ink is inhibited, and images are printed with gloss having a color which looks like gray. The present invention, however, does not exclude the use of such a pearlescent pigment having a high hiding power.

The colorant used in the present emulsion ink may be a known pigment, and may be contained in at least one of the oil phase and the water phase of the emulsion. Examples of the pigment for use in monochrome inks are carbon blacks such as furnace carbon black, lampblack, acetylene black and channel black, metals and metal oxides such as copper, iron and titanium oxide, and calcium carbonate. Examples of the pigment for use in color inks are organic pigments such as azo pigments, cyanine pigments, dioxazines pigments, and quinacridone pigments.

Addition amount of the colorant is preferably 1–30% by weight, more preferably 3–10% by weight based on the total of the emulsion ink.

The oil phase of the present W/O emulsion ink can comprise a non-volatile solvent, a volatile solvent and an emulsifier as so does the known emulsion ink. When the pearlescent pigment and/or colorant mentioned above are present in the oil phase, it is preferred that a resin is added to the oil phase. However, the oil phase may contain a resin even when the pearlescent pigment and/or colorant mentioned above are present in the water phase.

As the non-volatile solvent, can be used mineral oils such as motor oils, spindle oils, machine oils and liquid paraffin, and vegetable oils such as olive oil, castor oil and salad oils. As the volatile solvent, can be used known solvents of the types of mineral oils and vegetable oils. Proportion of non-volatile solvent to volatile solvent (i.e., non-volatile solvent/volatile solvent) varies depending upon blending ratio of the oil phase and the water phase, but is preferably 50–95/50–5 on weight basis.

The emulsifier is used to form the W/O emulsion of the ink, and is preferably a nonionic surfactant. As such a nonionic surfactant, mention may be made of sorbitan higher-fatty acid esters such as sorbitan monolaurate, sorbitan monopalmitate, sorbitan monostearate, sorbitan tristearate, sorbitan monooleate and sorbitan sesquioleate as well as fatty acid monoglycerides, fatty acid diglycerides, and ethylene oxide adducts of higher alcohols, alkylphenols, fatty acids or the like.

As the resin, mention may be made of phenolic resin, maleic resin, petroleum resin, alkyd resin, and the like.

When the pearlescent pigment and/or colorant mentioned above is present in the water phase, it is preferred that an oil-in-water (O/W) emulsion of resin and/or a water soluble resin are added to the water phase. By use of these additives in the water phase, can be improved fixation of the pearlescent pigment and the colorant to articles to be printed such as printing paper.

Examples of the O/W emulsion of resin include emulsions of resins such as polyvinyl acetate, copolymers of ethylene and vinyl acetate, copolymers of vinyl acetate and acrylic acid esters, polymethacrylic acid esters, polystyrene, copolymers of styrene and acrylic acid esters, styrene-butadiene copolymers, copolymers of vinylidene chloride and acrylic acid esters, polyvinyl chloride, copolymers of vinyl chloride and vinyl acetate, and polyurethane.

Examples of the water soluble resin include polyvinyl alcohol, methyl cellulose, carboxymethyl cellulose, hydroxyethyl cellulose, polyvinyl pyrrolidone, copolymers of polyethylene and polyvinyl alcohol, polyethylene oxide, polyvinyl ether, polyacrylamide, gum arabic, starch, and water-soluble polyurethane.

Addition amount of the O/W emulsion of resin and/or the water-soluble resin is preferably 20% by weight or less, more preferably 10% by weight or less as solid content based on the total weight of the emulsion ink. If it exceeds 20% by weight, inks form a film on perforations of a stencil sheet and often become difficult to pass the perforations when inks are left on the stencil sheet for a long time.

Furthermore, it is preferred that surfactants or the like are contained in the water phase in order to improve wetting, dispersion and the like of the colorant and/or the pearlescent pigment in water.

As required, the water phase may further contain other water soluble additives such as wetting agents, electrolytes, antifungal agents, antioxidants, water evaporation inhibiting agents and the like.

The present water-in-oil (W/O) emulsion ink can readily be made, for example, by gradually adding 90 to 30% by weight of the above mentioned water phase to 10 to 70% by weight of the above mentioned oil phase to emulsify the mixture.

EXAMPLES

Hereinafter, the present invention will be explained in more detail by way of presently preferred working examples. However, it should be understood that the present invention is not limited to the examples. In the following examples, the term "part(s)" means "part(s) by weight" unless otherwise indicated.

Examples 1–3

A water-in-oil (W/O) emulsion ink was prepared in accordance with the formulation shown in Table 1 in a manner mentioned below. Alkyd resin, furnace carbon black, sorbitan monooleate, #40 motor oil and No. 5 solvent were thoroughly mixed together under stirring, and then thoroughly kneaded by use of a mill having three rollers. Then, a pearlescent pigment shown in Table 3 was added to and further dispersed in the mixture to obtain an oil phase. Also, a solution of ethylene glycol in water was prepared by mixing them in a mixer to obtain a water phase. A water-in-oil (W/O) emulsion ink was prepared by gradually adding the water phase to the oil phase under stirring by a stirrer to cause emulsification.

Example 4

An oil phase which contained carbon black was prepared in the same manner as in Example 1. A water phase was prepared by mixing the pearlescent pigment shown in Table 3, water, ethylene glycol, methyl cellulose and acrylic acid ester, and effecting dispersion in a ball mill. A water-in-oil (W/O) emulsion ink was prepared by gradually adding the water phase to the oil phase under stirring by a stirrer to cause emulsification.

Example 5

A carbon black-dispersed solution was prepared by dispersing furnace carbon black, methyl cellulose and acrylic acid ester in water by use of a ball mill. Then, a pearlescent pigment-dispersed solution was prepared by dispersing a pearlescent pigment, methyl cellulose and ethylene glycol in water by use of a ball mill. Thereafter, these two dispersed-solutions were mixed together to obtain a water phase. An oil phase was prepared by mixing and thoroughly stirring sorbitan monooleate, #40 motor oil and No. 5 solvent together. A water-in-oil (W/O) emulsion ink was prepared by gradually adding the water phase to the oil phase under stirring by a stirrer to cause emulsification.

Comparative Examples 1 to 4

A water-in-oil (W/O) emulsion ink was each prepared in accordance with the same procedure as in Example 1.

Meanwhile, the average particle size of pearlescent pigments, which was shown in Table 3, was measured by use of a centrifugal particle size measuring apparatus CAPA-700 (manufactured by HORIBA Ltd.). Also, the hiding power was measured by use of a cryptometer.

TABLE 1

Formulations of W/O emulsion inks (parts by weight)

| | Number of Examples | | | | |
|---|---|---|---|---|---|
| | 1 | 2 | 3 | 4 | 5 |
| Oil phase: | | | | | |
| Resin: Alkyd resin | 11.0 | 11.0 | 6.0 | 9.0 | — |
| Non-volatile solvent: #40 Motor oil | 6.0 | 6.0 | 1.5 | 6.0 | 12.0 |
| Volatile solvent: No. 5 solvent (manufactured by Nippon Oil Co. Ltd.) | 3.0 | 3.0 | 1.5 | 5.0 | 7.0 |
| Emulsifier: Sorbitan monooleate | 2.0 | 2.0 | 2.0 | 2.0 | 3.0 |
| Oil/Water phase: | | | | | |
| Colorant: Furnace carbon black | 4.0 | 4.0 | 4.0 | 4.0 | 4.0 |
| Pearlescent pigment: Silver type (See Table 3) | 4.0 | 4.0 | 15.0 | 4.0 | 4.0 |
| Water phase: | | | | | |
| Water: ion-exchanged water | 63.0 | 63.0 | 63.0 | 57.0 | 54.0 |
| Water soluble resin: Methyl cellulose | — | — | — | 2.0 | 5.0 |
| (O/W) emulsion of resin: Acrylic acid ester (50% solution) | — | — | — | 5.0 | 5.0 |
| Wetting agent: Ethylene glycol | 7.0 | 7.0 | 7.0 | 6.0 | 6.0 |

TABLE 2

Formulations of W/O emulsion inks (parts by weight)

| | Number of Comparative Examples | | | |
|---|---|---|---|---|
| | 1 | 2 | 3 | 4 |
| Oil phase: | | | | |
| Resin: Alkyd resin | 13.0 | 11.0 | 5.0 | 11.0 |
| Non-volatile solvent: #40 Motor oil | 7.5 | 6.0 | 2.5 | 6.0 |
| Volatile solvent: No. 5 solvent (manufactured by Nippon Oil Co. Ltd.) | 3.5 | 3.0 | 1.5 | 3.0 |
| Emulsifier: Sorbitan monooleate | 2.0 | 2.0 | 2.0 | 2.0 |
| Oil/Water phase: | | | | |
| Colorant: Furnace carbon black | 4.0 | 4.0 | 4.0 | 4.0 |
| Pearlescent pigment: Silver type (See Table 3) | — | 4.0 | 25.0 | 4.0 |
| Water phase: | | | | |
| Water: ion-exchanged water | 63.0 | 63.0 | 53.0 | 63.0 |
| Water soluble resin: Methyl cellulose | — | — | — | — |
| (O/W) emulsion of resin: Acrylic acid ester (50% solution) | — | — | — | — |
| Wetting agent: Ethylene glycol | 7.0 | 7.0 | 7.0 | 7.0 |

TABLE 3

Types of pearlescent pigments used in Examples and Comparative Examples

| Kind | Average particle size (μm) | Hiding power ($cm^2/g$) | Examples and Comparative Examples used |
|---|---|---|---|
| Pearlescent pigment (MM-100R supplied by Nihon Kouken Kogyo Kabushiki Kaisha) | 5.2 | 482 | Examples 1, 3, 4 and 5, and Comparative Example 3 |
| Pearlescent pigment (MF-100 supplied by Nihon Kouken Kogyo Kabushiki Kaisha) | 15.0 | 268 | Example 2 |
| Pearlescent pigment (MF-100R supplied by Nihon Kouken Kogyo Kabushiki Kaisha) | 35.1 | 141 | Comparative Example 2 |
| Rutile titanium oxide | 0.2 | 1,120 | Comparative Example 4 |

Performance tests

Stencil printing was effected by use of a stencil printing apparatus RISOGRAPH (registered trademark) RA205 (manufactured by RISO KAGAKU CORPORATION) with each of the stencil printing emulsion inks obtained in Examples 1 to 5 and Comparative Examples 1 to 4. Glossiness, printing density, set-off and white dots in solid regions of the obtained prints were evaluated in accordance with the following procedures. The results are shown in Table 4.

The following evaluations were made by use as printing paper of wood free sheets and ground wood sheets:

(1) Glossiness: This was evaluated by observing the solid region of print with naked eyes. When glossiness is found, the result was indicated as (+). When no glossiness is found, the result was indicated as (−).

(2) Printing density: Printing density on a solid region of print was measured using an optical density measuring apparatus RD920 manufactured by Macbeth Corp.

(3) White dots: White dots on a solid region of print were observed with naked eyes. When white dots were a few, the result was indicated as (−). When white dots were many, the result was indicated as (+).

(4) Set-off: A blank wood free sheet was laid on a solid portion of print, and a pressure of 1 kg/cm² was applied onto the blank sheet. Then, an amount of ink transferred to the blank sheet was observed. When no ink was found to be transferred, the result was indicated as (−). When ink was found to be transferred, the result was indicated as (+).

TABLE 4

Results of Examples and Comparative Examples

| | Ex. 1 | Ex. 2 | Ex. 3 | Ex. 4 | Ex. 5 | C. Ex. 1 | C. Ex. 2 | C. Ex. 3 | C. Ex. 4 |
|---|---|---|---|---|---|---|---|---|---|
| (1) Glossiness | (+) | (+) | (+) | (+) | (+) | (−) | (+) | (+) | (−) |
| (2) Printing density | 1.10 | 1.12 | 1.05 | 1.12 | 1.14 | 1.10 | 1.08 | 0.82 | 0.81 |

TABLE 4-continued

Results of Examples and Comparative Examples

|  | Ex. 1 | Ex. 2 | Ex. 3 | Ex. 4 | Ex. 5 | C. Ex. 1 | C. Ex. 2 | C. Ex. 3 | C. Ex. 4 |
|---|---|---|---|---|---|---|---|---|---|
| (3) White dots | (−) | (−) | (−) | (−) | (−) | (−) | (+) | (−) | (−) |
| (4) Set-off | (−) | (−) | (−) | (−) | (−) | (+) | (−) | (−) | (−) |

Note:
"Ex." refers to Example, and
"C. Ex." refers to Comparative Example.

From Table 4, it is found that not only glossiness but also printing density were kept higher in Examples 1 to 5 than Comparative Examples 1 to 4. It is also shown that inks to which pearlescent pigments are added take a short time to dry.

Since the present water-in-oil (W/O) emulsion ink contains a pearlescent pigment, it provides glossy printed images without lowering printing density regardless of types of printing paper. Also, the present invention makes it possible to shorten the time that inks take to dry, reducing the occurrence of set-off.

What we claim is:

1. A water-in-oil (W/O) emulsion ink for stencil printing, said emulsion ink having an oil phase and a water phase and a pearlescent pigment contained in said oil phase and/or said water phase in an amount of 1 to 20% by weight of the total weight of said emulsion ink, said pearlescent pigment having both an average particle size of 1 to 30 µm, and a hiding power of 1.000 cm$^2$/g or lower.

2. An emulsion ink for stencil printing according to claim 1, in which a colorant is contained in at least one of said oil phase and said water phase.

3. An emulsion ink for stencil printing according to claim 1, in which said oil phase comprises a non-volatile solvent, a volatile solvent, and an emulsifier.

4. An emulsion ink for stencil printing according to claim 3, in which said oil phase further comprises a resin.

5. An emulsion ink for stencil printing according to claim 1, in which an oil-in-water (O/W) emulsion of resin and/or a water soluble resin are contained in said water phase.

* * * * *